(12) United States Patent
Emer

(10) Patent No.: US 6,380,512 B1
(45) Date of Patent: Apr. 30, 2002

(54) METHOD FOR REMOVING COATING MATERIAL FROM A COOLING HOLE OF A GAS TURBINE ENGINE COMPONENT

(75) Inventor: George Emer, Cresskill, NJ (US)

(73) Assignee: Chromalloy Gas Turbine Corporation, Orangeburg, NY (US)

( * ) Notice: Subject to any disclaimer, the term of this patent is extended or adjusted under 35 U.S.C. 154(b) by 0 days.

(21) Appl. No.: 09/973,642

(22) Filed: Oct. 9, 2001

(51) Int. Cl.[7] .............................................. B23K 26/02
(52) U.S. Cl. ............................ 219/121.71; 219/121.83; 219/121.85; 29/889.1
(58) Field of Search ................. 219/121.71, 121.67, 219/121.68, 121.69, 121.7, 121.72, 121.83, 121.62, 121.85; 29/889.1, 889.2, 889.72, 889.721; 700/159, 166, 162, 160, 173

(56) References Cited

U.S. PATENT DOCUMENTS

| | | | |
|---|---|---|---|
| 4,555,610 A | 11/1985 | Polad et al. ................. 219/121 |
| 4,995,087 A | 2/1991 | Rathi et al. ..................... 382/8 |
| 4,998,005 A | 3/1991 | Rathi et al. ............. 219/121.83 |
| 5,125,035 A | * 6/1992 | McCarthy et al. ............ 348/94 |
| 5,216,808 A | 6/1993 | Martus et al. .............. 29/889.1 |
| 5,418,345 A | * 5/1995 | Adamski ............... 219/121.71 |
| 5,554,837 A | 9/1996 | Goodwater et al. .... 219/121.63 |
| 5,751,585 A | * 5/1998 | Cutler et al. ................. 318/571 |
| 5,893,987 A | * 4/1999 | Yamazaki et al. ..... 219/121.61 |
| 6,154,959 A | * 12/2000 | Goodwater et al. .......... 228/119 |
| 6,173,491 B1 | * 1/2001 | Goodwater et al. ......... 29/889.1 |
| 6,269,540 B1 | * 8/2001 | Islam et al. .............. 29/402.18 |

* cited by examiner

Primary Examiner—Tom Dunn
Assistant Examiner—Jonathan Johnson
(74) Attorney, Agent, or Firm—Mitchell D. Bittman

(57) ABSTRACT

A process is provided for laser drilling to remove coating material obstructing cooling holes of a gas turbine component by utilizing a CNC component program which is preprogrammed with the general location of the cooling holes of a component to move a machine vision system and component relative to each other to each cooling hole location for a series of cooling holes, determining the actual location for each cooling hole and storing in the memory of the CNC or a data storage device the actual locations for the cooling holes for the series of cooling holes, followed by laser drilling based on the actual location of the cooling holes stored in the memory of the CNC or the data storage device to remove the coating material obstructing the cooling holes for the series of cooling holes. This process can be advantageously carried out to determine the actual location of the cooling holes either on a coated component or a component that has been prepared for coating.

19 Claims, 1 Drawing Sheet

METHOD FOR REMOVING COATING MATERIAL FROM A COOLING HOLE OF A GAS TURBINE ENGINE COMPONENT

BACKGROUND OF THE INVENTION

This invention relates to a method of manufacturing or repairing gas turbine components in which cooling holes have been partially or fully obstructed with coating material by laser drilling to open such cooling holes.

Advanced gas turbine engine components operating in the hot sections of the engine can experience temperatures which can contribute to reduction in the operating life of the components. Generally, such components include turbine blades and vanes, combustors, turbine shrouds and various components in the exhaust system. To improve component life, such components have been designed to include cooling passages within the body of the component exiting a surface or about a component surface. For additional thermal and or environmental resistance, frequently there is included on a surface exposed to higher temperatures, a high temperature protective coating such as a metallic or ceramic type coating. Examples of such coatings include aluminides, platinum aluminides, MCrAlY (in which M is at least one of the elements Fe, Co, and Ni), various metal overlay type coatings, and ceramic thermal protective coatings, one type of which is referred to in the art as Thermal Barrier Coatings or TBC. Typical of TBC coatings is one based on zirconia stabilized with yttria, for example about 92 wt. % zirconia stabilized with about 8 wt. % yttria. Methods for application of a TBC coating include plasma spraying and electron beam physical vapor deposition. Frequently, such coatings are used with a metallic bond coat.

In order to function properly, the cooling holes must be constructed to a specified configuration and dimensions because the distribution of air flow must be controlled to achieve proper cooling of the component during engine operation. Thus, the cooling holes must not be blocked or even partially blocked to provide a sufficient and uniform cooling air distribution through the component interior and across the exterior of the component. Application of a coating can result in a significant reduction in air flow through cooling holes and can result in complete closure of the cooling holes.

Therefore, after a coating is applied the cooling holes may have to be opened to their original specified dimensions to provide proper cooling of the component and/or to restore proper airflow and the holes must be opened without causing damage to the parent material of the component or to the coating in areas other than where it is desired to remove the coating. A method of opening the holes needs to provide precise control to redrill into an existing cooling hole as well as a process which can be operated efficiently on a commercial basis with regard to reduced process time and avoidance of errors in drilling.

While the specifications (e.g. blueprint) for a component will indicate the general location of the cooling holes, minor variations will occur during manufacturing when the cooling holes are installed (e.g. by laser drilling, EDM, ECM or the like), with these minor variations becoming critical when redrilling is attempted. Further, with components being repaired variations in cooling hole location can occur due to use or repair operations. Thus precise and accurate control of the laser drilling to reopen the cooling holes is required. In addition, during laser drilling a significant amount of debris is generated which can interfere with further drilling, particularly when a machine vision system is utilized, requiring frequent stopping and cleaning of the component.

The use of an Excimer laser for opening a blocked cooling hole is described in U.S. Pat. No. 5,216,808; however, a process which can be efficiently operated utilizing a ND/YAG type laser is desired.

SUMMARY OF THE INVENTION

Briefly, the present invention provides a process for laser drilling to remove coating material from obstructed cooling holes of a gas turbine component by utilizing a CNC component program which is preprogrammed with the general location of the cooling holes of a component to move a machine vision system and component relative to each other to each cooling hole location for a series of cooling holes, determining the actual location for each cooling hole and storing in the memory of the CNC or a data storage device the actual locations for the cooling holes for the series of cooling holes, followed by laser drilling based on the actual location of the cooling holes stored in the memory of the CNC or the data storage device to remove the coating material obstructing the cooling holes for the series of cooling holes. This process can be advantageously carried out to determine the actual location of the cooling holes either on a coated component or a component that has been prepared for coating.

DETAILED DESCRIPTION OF THE INVENTION

Figure 1:
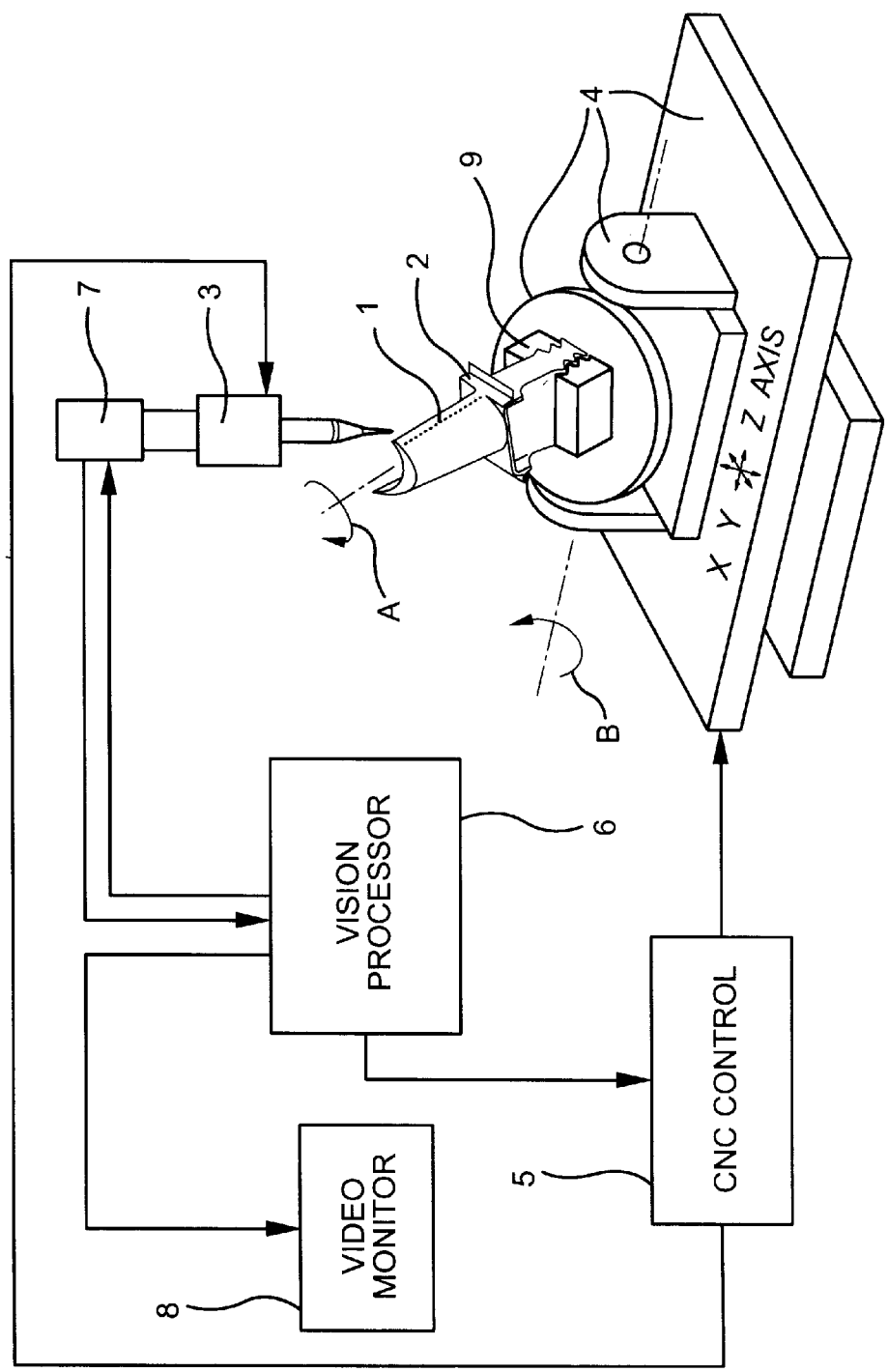
FIG. 1 is a schematic diagram of a system for opening blocked cooling holes in accordance with the method of this invention.

Referring to FIG. 1 a schematic diagram is shown of a system for removing coating material from cooling holes 1 of a gas turbine engine component 2. During the manufacturing or repair of a gas turbine engine component, the component may be completely or partially coated with coating material. Suitable coating materials include aluminide, platinum aluminide, MCrAlY wherein M is at least one of Ni, Co and Fe and a ceramic thermal barrier coating (TBC), such as zirconia stabilized with yttria or the like. The coating may be applied by plasma spray, physical vapor deposition (PVD) or other coating methods. During the application of the coating material, the cooling holes may become completely or partially blocked.

The present invention provides a process for removing coating material which may have obstructed any or all of cooling holes during the deposition of the coating and includes a laser for directing a pulsed laser beam on the location of the cooling hole to remove or clean-out the obstruction to reestablish the cooling hole diameter and/or establish a proper airflow without deforming or damaging the component or altering the design geometry or configuration of the cooling hole.

A suitable industrial type laser is the ND/YAG laser, such as a Convergent Aurora P-50L. Typically a Nd/YAG type laser utilizes a laser beam which is pulsed with each pulse having a pulse width between about 0.3 and 10 milliseconds, preferably about 0.6 milliseconds, and a wavelength of about 1060 nanometers. The energy of the laser beam may be between about 5 joules/sq.cm. and about 15 joules/sq.cm., depending upon the type of coating material being removed.

The laser apparatus 3 may be mounted vertically or horizontally and the component 2 may be mounted on a multi-axis table 4 controlled by a CNC 5 (computer numerical control) or similar programmable component positioning mechanism, such as an industrial robot, for positioning and moving the component 1 and the laser apparatus 3 relative to each other to focus the laser beam on any partially or completely blocked cooling holes 1 for removal of the obstruction. In accordance with the present invention, the CNC 5 is preprogrammed with program data or tool path data which contains the specifications of the cooling hole locations and angles for such component type. This can be obtained from the blueprint data which was used to originally drill or form cooling holes or from measurements taken from the manufactured component. The cooling holes may be originally drilled or formed using an Nd/YAG type laser or similar high power industrial laser, electrical discharge machining (EDM), electro-chemical machining (ECM) or the like. While the CNC component program provides the general location of the cooling holes, variations occur in the manufacturing process when the cooling holes are installed or variations can occur during use or repair of the component and a more precise actual location is required to effectively redrill a coated hole without damage to the component.

The laser apparatus 3 is used with a machine vision system. The vision system includes a camera 7 (e.g. a video camera), a vision processor 6 (e.g. a PC with image capture capabilities and a monitor), a video monitor 8. The camera 7 generates a video signal from an image of the component 2 and provides this signal to vision processor 6. As illustrated in FIG. 1 the vision system camera 7 may be mounted to the laser 3 to obtain an image through the laser lens system or it may be separate from the laser.

The CNC controls the laser 3 and the multi-axis table 4 and the CNC component program is used to move the machine vision camera 7 and component 2 relative to each other in accordance with the preprogrammed general location. The vision processor 6 of the machine vision system will then analyze the image to determine the actual location for each cooling hole 1 and store this location in the memory of the CNC or data storage device (e.g. hard disc, disc, network etc.). In a preferred embodiment the value stored in the memory of the CNC or the data storage device is the actual location of the cooling hole. This determination of actual location of the cooling hole and storing the actual locations in CNC memory or data storage device continue for a series of cooling holes which are to be redrilled with the laser. Typically, at least a full row of holes up to all the holes of a component, for example, a blade or vane, is evaluated in this manner prior to laser drilling the series of holes. Typically from 10 to 600 cooling holes will be evaluated prior to laser drilling. This separate evaluation of the actual location of a series of cooling holes followed by laser drilling the series of cooling holes provides an efficient process avoiding having the debris from laser drilling interfering with the determination of the actual location of the cooling holes.

Where the machine vision system does not locate the actual location of the cooling hole based on a preprogrammed general location of the cooling hole (e.g. if the cooling hole was fully blocked) then the value stored in the CNC memory or data storage device for laser drilling will be the preprogrammed general location adjusted by a correction. This correction is based on the actual location of the previous cooling hole compared to the preprogrammed general location of the previous cooling hole.

The monitor 8 permits viewing of the evaluation and laser drilling process in real time by a human operator. The operator can communicate with the vision processor and override or modify the location values. The operator can thus check the actual location of the cooling holes determined by the vision system and override any erroneous locations.

This system also allows the operator prior to laser drilling to utilize the CNC to move the machine vision system for the series of cooling holes to each cooling hole location based on the actual locations of the cooling holes stored in the memory of the CNC or the data storage device to check the accuracy of the actual locations of the cooling holes stored in the memory.

The multi-axis table 4 as shown in FIG. 1 has a 3 axis (XYZ) positioning table and a rotate and tilt table (AB), for linear and angular positioning, and includes a fixture 9 for holding component 2 in position as the camera 7/laser 3 and table 4 are moved to the proper position for each cooling hole 1 to determine actual hole location and to redrill cooling holes 1 by generating laser beam responsive to signals form the computer numerical controller 5.

It is also within the scope of the present invention to mount component 2 in a stationary fixture and to move the laser apparatus 3 and camera 7 relative to the component 2 using a suitable positioning mechanism, such as an industrial robot or the like, or both the component 2 and laser apparatus 3/camera 7 may be moved relative to each other.

The use of a fixture 9 to accurately position the component 2 allows the component to be prepared for coating and then evaluated to determine and store the actual location of the cooling holes, then removing the component from the fixture and coating the component, followed by accurately repositioning the component in the fixture for laser drilling the coating material blocking the cooling holes based on the actual location of the cooling holes stored in the memory of the CNC or the data storage device. The component can be prepared for coating by one or more of various processes including cleaning, grit blasting, repair (e.g. welding, brazing, blending) etc. This preparation step may also include coating the component with an intermediate coating material. The actual location of the cooling holes is then determined and stored in CNC memory or data storage device for a particular component. Following coating these actual locations are recalled from the CNC memory or data storage device to redrill the cooling holes for this particular component. Accurately positioning and determining the orientation of the coated component prior to determination of actual location of the cooling holes and prior to laser drilling can be carried out by use of the fixture and a position sensing system. For example, a touch probe (e.g. a Renshaw touch probe) will touch the component at a number of locations (typically 6) and the CNC will adjust for the actual orientation of the component.

What is claimed:

1. A process for laser drilling to remove coating material from obstructed cooling holes of a gas turbine component comprising:

providing a CNC component program for a CNC which controls a laser and a motion system, wherein the motion system adjusts for the relative position, distance and angle of the laser to the component and the CNC component program is preprogrammed with the general location of the cooling holes for said component;

utilizing the CNC component program to move a machine vision system and the component relative to each other to each cooling hole location for a series of cooling holes of a coated component based on the preprogrammed general location and determining the actual location for each of said cooling holes and storing in the memory of the CNC or a data storage device the actual locations of the cooling holes for the series of cooling holes; and followed by laser drilling based on the actual locations of the cooling holes stored in the memory of the CNC or the data storage device to remove the coating material obstructing the cooling holes for the series of cooling holes.

2. Process of claim 1 wherein if the machine vision system does not locate the actual location of the cooling hole based on a preprogrammed general location of the cooling hole then the value stored in the memory for the CNC or the data storage device for laser drilling will be the preprogrammed general location adjusted by a correction for the actual location of the previous cooling hole compared to the preprogrammed general location of the previous cooling hole.

3. Process of claim 2 wherein the machine vision system also provides a real time video monitor for an operator which allows the operator to check the actual locations of the cooling holes found by the vision system and override any erroneous locations.

4. Process of claim 3 further comprising prior to laser drilling utilizing the CNC component program to move the machine vision system to each cooling hole location based on the actual locations of the cooling holes stored in the memory of the CNC or the data storage device to check the accuracy of the actual locations of the cooling holes stored in the memory.

5. Process of claim 1 wherein the value stored in the memory of the CNC or the data storage device is the actual location for the cooling hole.

6. Process of claim 1 wherein the coating material is chosen from the group consisting of an aluminide, a platinum aluminide, an MCrAlY wherein M is at least one of Ni, Co and Fe, a ceramic thermal barrier coating and combinations thereof.

7. Process of claim 1 wherein the series of cooling holes is from 10 to 600 cooling holes.

8. Process of claim 1 wherein the series of cooling holes is all the obstructed cooling holes of a component which require laser drilling to remove coating material.

9. A process for laser drilling to remove coating material from obstructed cooling holes of a gas turbine component comprising:

providing a CNC component program for a CNC which controls a laser and a motion system, wherein the motion system adjusts for the relative position, distance and angle of the laser to the component and the CNC component program is preprogrammed with the general location of the cooling holes for said component;

preparing the component to be coated with a coating material;

utilizing the CNC component program to move a machine vision system and the component relative to each other to each cooling hole location for a series of cooling holes of the component based on the preprogrammed general location and determining the actual location for each of said cooling holes and storing in the memory of the CNC or a data storage device the actual locations of the cooling holes for the series of cooling holes;

coating the component with the coating material with the coating material obstructing the cooling holes; and followed by laser drilling based on the actual locations of the cooling holes stored in the memory of the CNC or the storage device to remove the coating material obstructing the cooling holes for the series of cooling holes.

10. Process of claim 9 wherein if the machine vision system does not locate the actual location of the cooling hole based on a preprogrammed general location of the cooling hole then the value stored in the memory for the CNC or the data storage device for laser drilling will be the preprogrammed general location adjusted by a correction for the actual location of the previous cooling holes compared to the preprogrammed general location of the previous cooling hole.

11. Process of claim 10 wherein the machine vision system also provides a real time video monitor for an operator which allows the operator to check the actual hole locations found by the vision system and override any erroneous locations.

12. Process of claim 11 further comprising prior to laser drilling utilizing the CNC component program to move the machine vision system to each cooling hole location based on the actual locations of the cooling holes stored in the memory of the CNC or the data storage device to check the accuracy of the actual locations of the cooling holes stored in the memory.

13. Process of claim 9 wherein the value stored in the memory of the CNC or the data storage device is the actual location for the cooling hole.

14. Process of claim 9 wherein the coating material is chosen from the group consisting of an aluminide, a platinum aluminide, an MCrAlY wherein M is at least one of Ni, Co and Fe, a ceramic thermal barrier coating and combinations thereof.

15. Process of claim 9 further comprising prior to determining actual location and prior to laser drilling of the cooling holes using a position sensing system to accurately determine the orientation of the component.

16. Process of claim 15 wherein the position sensing system is a touch probe.

17. Process of claim 9 wherein the component is prepared to be coated by coating with an intermediate coating material.

18. Process of claim 9 wherein the series of cooling holes is from 10 to 600 cooling holes.

19. Process of claim 9 wherein the series of cooling holes is all the obstructed cooling holes of a component which require laser drilling to remove coating material.

* * * * *